US012676803B2

(12) United States Patent
Maxim et al.

(10) Patent No.: US 12,676,803 B2
(45) Date of Patent: Jul. 7, 2026

(54) SYSTEMS AND METHODS FOR GENERATING AND DYNAMICALLY ADJUSTING ARTIFICIAL INTELLIGENCE ENGINE PARAMETERS IN A DISTRIBUTED NETWORK

(71) Applicant: BANK OF AMERICA CORPORATION, Charlotte, NC (US)

(72) Inventors: Ana Maxim, Arlington, VA (US); Sandra Lynn Dube, Salt Lake City, UT (US); Manu Jacob Kurian, Dallas, TX (US); Marshall Adam Johnson, Summit, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 4 days.

(21) Appl. No.: 18/910,787

(22) Filed: Oct. 9, 2024

(65) Prior Publication Data

US 2026/0100895 A1     Apr. 9, 2026

(51) Int. Cl.
*H04L 43/065* (2022.01)
*G06N 20/00* (2019.01)
*H04L 41/16* (2022.01)

(52) U.S. Cl.
CPC ........... *H04L 43/065* (2013.01); *G06N 20/00* (2019.01); *H04L 41/16* (2013.01)

(58) Field of Classification Search
CPC ........ H04L 43/065; H04L 41/16; G06N 20/00
See application file for complete search history.

(56) References Cited

U.S. PATENT DOCUMENTS

2021/0295427 A1* 9/2021 Shiu .......................... G06N 5/04

* cited by examiner

*Primary Examiner* — Bryan Y Lee
(74) *Attorney, Agent, or Firm* — Moore & Van Allen PLLC; Lauren M. Stokes

(57) ABSTRACT

Systems, computer program products, and methods are described herein for generating and dynamically adjusting artificial intelligence engine parameters in a distributed network. The present disclosure is configured to identify user data; analyze, by an artificial intelligence engine, the user data based on defined parameters used to train the artificial intelligence engine; generate an output by the artificial intelligence engine based on the user data analysis; generate, by the artificial intelligence engine, a report comprising information of at least one of the user data analysis for each of the one or more defined parameters or one or more reasons for the output; automatically transmit the report to a user device; receive at least one user input in response to the report; generate, by the artificial intelligence engine, a regenerated output based on the user input; and automatically transmit a regenerated report based on the regenerated output to the user device.

13 Claims, 8 Drawing Sheets

130

106

112

114

108

104

116

102

111

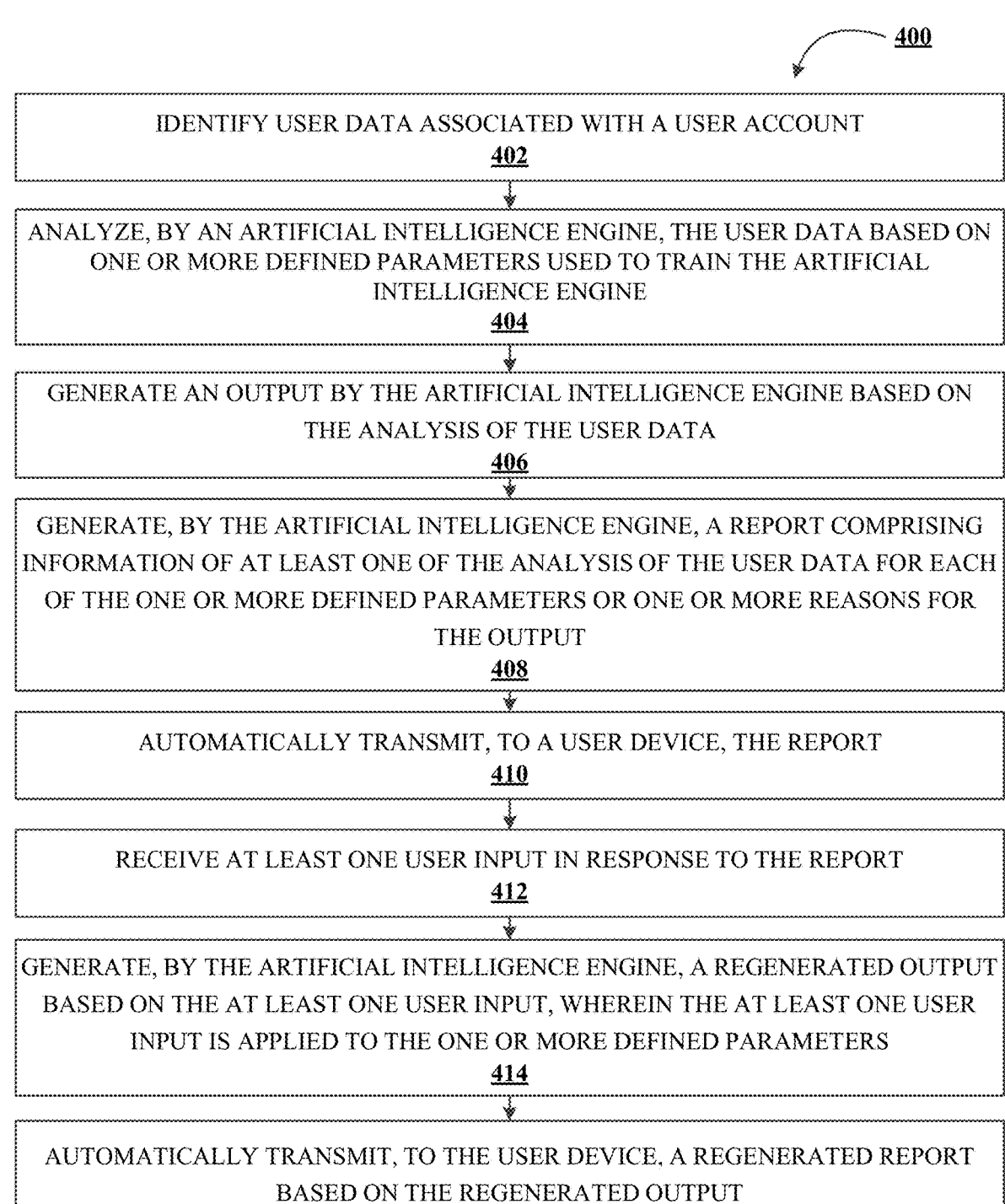

400

IDENTIFY USER DATA ASSOCIATED WITH A USER ACCOUNT
402

ANALYZE, BY AN ARTIFICIAL INTELLIGENCE ENGINE, THE USER DATA BASED ON ONE OR MORE DEFINED PARAMETERS USED TO TRAIN THE ARTIFICIAL INTELLIGENCE ENGINE
404

GENERATE AN OUTPUT BY THE ARTIFICIAL INTELLIGENCE ENGINE BASED ON THE ANALYSIS OF THE USER DATA
406

GENERATE, BY THE ARTIFICIAL INTELLIGENCE ENGINE, A REPORT COMPRISING INFORMATION OF AT LEAST ONE OF THE ANALYSIS OF THE USER DATA FOR EACH OF THE ONE OR MORE DEFINED PARAMETERS OR ONE OR MORE REASONS FOR THE OUTPUT
408

AUTOMATICALLY TRANSMIT, TO A USER DEVICE, THE REPORT
410

RECEIVE AT LEAST ONE USER INPUT IN RESPONSE TO THE REPORT
412

GENERATE, BY THE ARTIFICIAL INTELLIGENCE ENGINE, A REGENERATED OUTPUT BASED ON THE AT LEAST ONE USER INPUT, WHEREIN THE AT LEAST ONE USER INPUT IS APPLIED TO THE ONE OR MORE DEFINED PARAMETERS
414

AUTOMATICALLY TRANSMIT, TO THE USER DEVICE, A REGENERATED REPORT BASED ON THE REGENERATED OUTPUT
416

GENERATE AN INTERFACE COMPONENT COMPRISING ONE OR MORE
HYPOTHETICAL OUTPUTS BASED ON USER INPUT
502

TRANSMIT THE INTERFACE COMPONENT TO A USER DEVICE, WHEREIN THE USER
DEVICE COMPRISES A GRAPHICAL USER INTERFACE
504

TRIGGER A CONFIGURATION OF THE GRAPHICAL USER INTERFACE OF THE USER
DEVICE WITH THE INTERFACE COMPONENT
506

SYSTEMS AND METHODS FOR GENERATING AND DYNAMICALLY ADJUSTING ARTIFICIAL INTELLIGENCE ENGINE PARAMETERS IN A DISTRIBUTED NETWORK

TECHNOLOGICAL FIELD

The present disclosure is related generally to generating and dynamically adjusting artificial intelligence engine parameters in a distributed network.

BACKGROUND

Use of artificial intelligence (AI) by entities or other users in output generation processes may present a number of problems. For one, the quality of the output generated by AI relies heavily on the quality and quantity of the data the AI is trained with. When an output is generated by the AI, it can be difficult for the entity itself or for users impacted by the output to fully understand why a certain output was generated or what datapoints led to which outputs. There may also be implicit bias built into artificial intelligence, and without understanding how AI generates a given output, it can be difficult to track or eliminate such biases. Additionally, especially when generated outputs comprise sensitive data, there may be security concerns regarding how that generated output is released to users, the entities, or shared with third parties.

Applicant has identified a number of deficiencies and problems associated with the use of artificial intelligence in output generation, and a need exists to develop systems, computerized methods, computer program products and the like that allow for AI-made decisions to be explained by the AI and adjusted dynamically based on user inputs. Through applied effort, ingenuity, and innovation, many of these identified problems have been solved by developing solutions that are included in embodiments of the present disclosure, many examples of which are described in detail herein.

BRIEF SUMMARY

The following a simplified summary of one or more embodiments of the disclosure in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present disclosure provide for systems, methods, computer program products and the like that provide for generating and dynamically adjusting artificial intelligence engine parameters in a distributed network. Specifically, the disclosure first involves identifying user data associated with a particular user or user account. The user data may be received from the user as initial user input or through external sources associated with the user. The user data is analyzed by an artificial intelligence engine based on certain predefined parameters that the artificial intelligence engine was initially trained with. The artificial intelligence engine then generates an output based on the analysis of the user data as well as a report detailing the analysis and/or explaining the reasons for the output. The report is sent to the user's device and the user can then respond to the report via user input. In some embodiments, the user input at this stage may also come from external sources. User input may comprise, among others, one or more of a modification of the user data, additional user data, a request for further details, or hypothetical questions regarding the output. The artificial intelligence engine then applies the user input, along with the initial user data, to the predefined parameters to generate a regenerated output and a regenerated report based on the regenerated output. In some embodiments of the disclosure, if the user input isn't particularly relevant to the predefined parameters, for example, the artificial intelligence engine may automatically adjust the predefined parameters to consider the user input. In some embodiments, the artificial intelligence engine may determine that the user input is not relevant to the predefined parameters and determine that a new output is not warranted. The user can provide user input and the artificial intelligence engine can generate regenerated outputs and regenerated reports multiple times until an output desired by the user is achieved or as many times as the user desires.

In some embodiments of the disclosure, the report and any regenerated reports are transmitted to the user in a distributed ledger environment. The user input may comprise a selection of data from the primary distributed ledger, through which the report is presented to the user, to be shared with a third party or entity through an intermediate distributed ledger. In some embodiments, the user input may comprise the third party or entity with whom information needs to be shared and the artificial intelligence engine may automatically generate the selection of data to be shared to populate the intermediate distributed ledger.

In some embodiments of the disclosure, the disclosure provides for responding to hypothetical questions from the user by generating an interface component comprising one or more hypothetical outputs, transmitting the interface component to the user device, and triggering a configuration of the graphical user interface of the user device with the interface component. In other words, the disclosure allows for an interaction between the artificial intelligence engine and the user to allow the user to request hypothetical results without the artificial intelligence engine generating a new, regenerated output and report.

As such, the present disclosure provides for a decision-making artificial intelligence engine that explains its decisions to the user and allows for adjustment based on additional user input to overcome the typical black box nature of AI.

A system for generating and dynamically adjusting artificial intelligence engine parameters in a distributed network defines first embodiments of the disclosure. The system comprises a processing device that first identifies user data associated with a particular user or user account. The user data may be received from the user as initial user input or through external sources. For example, a user's credit report that the is pulled by the system or by the entity and sent to the system from a credit reporting agency may be an example of the system receiving initial user input from an external source. The user data is analyzed by an artificial intelligence engine by applying the user data to certain defined parameters. The artificial intelligence engine may have been initially trained on data using the defined parameters. These defined parameters may constitute datapoints to be considered in making a decision.

The artificial intelligence engine then generates an output based on the analysis of the user data as well as a report detailing the analysis and/or explaining the reasons for the output. The output may essentially be the decision made by the artificial intelligence engine based on the user data and the defined parameters. The report is sent to a user device associated with the user and the system can then receive user input in response to the report. The user input may, like with the initial user input, be received from one or more external sources. The user input may also be received directly from the user. In some embodiments of the disclosure, the user may directly modify the initial user data or provide additional data. In some embodiments, the user may interact with external sources to make a change and ask the system to receive user input from the source directly. In further embodiments, the user may, via user input, request further details on the analysis of the user data or ask hypothetical questions regarding the output. The artificial intelligence engine may then apply the user input, along with the initial user data, to the defined parameters to generate a regenerated output and a regenerated report based on the regenerated output. In some embodiments of the disclosure, the system or the artificial intelligence engine may respond to the user input in various different ways. For example, if the user input isn't particularly relevant to the predefined parameters but could impact the output, the artificial intelligence engine may automatically adjust the predefined parameters to consider the user input. Alternatively, the artificial intelligence engine may determine that the user input is not relevant to the predefined parameters and determine that a new output is not warranted. In that case, the artificial intelligence engine may generate the same output and report again to be transmitted to the user device or the artificial intelligence engine or the system could simply alert the user that there were no changes, or that the user input did not impact the output. In some embodiments, the artificial intelligence engine may generate a report detailing why the user input did not impact the output. The user can provide user input and the artificial intelligence engine can generate regenerated outputs and regenerated reports multiple times until an output desired by the user is achieved or as many times as the user desires.

In some embodiments of the disclosure, the report and any regenerated reports are transmitted to the user in a distributed ledger environment. The user input may comprise a selection of data from the primary distributed ledger, through which the report is presented to the user, to be shared with a third party or entity through an intermediate distributed ledger. This way, the selected data can be transferred to the third party or entity in a secure and accurate manner. In some embodiments, the artificial intelligence engine may automatically generate the selection of data based on the third party or entity the data needs to go to and populate the intermediate distributed ledger.

In some embodiments, the disclosure provides for responding to hypothetical questions from the user by generating an interface component comprising one or more hypothetical outputs, transmitting the interface component to the user device, and triggering a configuration of the graphical user interface of the user device with the interface component. In other words, the disclosure allows for an interaction between the artificial intelligence engine and the user to allow the user to request hypothetical results without the artificial intelligence engine generating a new, regenerated output and report. This can allow the user to interact directly with the system and the artificial intelligence engine to see what changes can help achieve the outcome the user desires without having to make external changes and the artificial intelligence engine won't have to regenerate an output by recollecting data from external sources, for example.

A computer-implemented method for generating and dynamically adjusting artificial intelligence engine parameters in a distributed network defines second embodiments of the disclosure. The computer-implemented method is executed by one or more computing processor devices. The method comprises identifying user data associated with a particular user or user account, based on initial user input and/or data from one or more external sources. The user data is analyzed by an artificial intelligence engine based on defined parameters. The artificial intelligence engine may have been initially trained on data using the defined parameters. The artificial intelligence engine generates an output, i.e., a decision, based on the analysis of the user data. The artificial intelligence engine also generates a report detailing the analysis and/or explaining the reasons for the outputs. The report is sent to the user's user device. In some embodiments, at least one of the output or the report is sent to the entity using the artificial intelligence engine for decision-making. This can allow the entity to review the decisions made by the artificial intelligence engine and how the artificial intelligence engine is coming to those decisions to identify any underlying biases in the AI-based decision-making practices as well as any unfair practices. The entity can use that information to eliminate such biases or otherwise course correct—by retraining the artificial intelligence engine, for example. The method further comprises receiving user input in response to the report and applying the user input, along with the initial user data, to the defined parameters to generate a regenerated output and a regenerated report based on the regenerated output and transmit the regenerated report to the user device.

In some embodiments of the disclosure, the report and any regenerated reports are transmitted to the user in a distributed ledger environment. The user input may comprise a selection of data from the primary distributed ledger, through which the report is presented to the user, to be securely shared with a third party or entity through an intermediate distributed ledger. In some embodiments, the artificial intelligence engine may automatically generate the selection of data based on the third party or entity the data needs to go to and populate the intermediate distributed ledger.

In some embodiments, user input may comprise hypothetical questions from the user regarding the output. The method may further comprise responding to the hypothetical questions by generating an interface component comprising one or more hypothetical outputs, transmitting the interface component to the user device, and triggering a configuration of the graphical user interface of the user device with the interface component. In other words, the method comprises allowing the user to interact with the artificial intelligence engine through a graphical user interface to see hypothetical outputs based on various parameters that the user can adjust without the artificial intelligence engine having to regenerate an output or report. The user can adjust parameters through the graphical user interface to see how the user can get to an outcome the user desires.

A computer program product including a non-transitory computer-readable medium defines third embodiments of the disclosure. The computer-readable medium comprises sets of codes for causing computing device(s) to identify user data associated with a user account and analyze the data using an artificial intelligence engine based on defined parameters through which the artificial intelligence engine was trained. The computer-readable medium further comprises sets of codes for causing computing device(s) to generate an output using the artificial intelligence engine based on the analysis of the user data as well as a report detailing the analysis and/or explaining the reasons for the output. The computer-readable medium further comprises sets of codes for causing computing device(s) to receive user input in response to the report and apply the user input, to the defined parameters to generate a regenerated output and a regenerated report based on the regenerated output and transmit the regenerated report to a user device.

In some embodiments of the disclosure, the report and any regenerated reports are transmitted to the user in a distributed ledger environment. The user input may comprise a selection of data from the primary distributed ledger, through which the report is presented to the user, to be shared in a secure and accurate manner with a third party or entity through an intermediate distributed ledger. In some embodiments, the artificial intelligence engine may automatically generate the selection of data based on the third party or entity the data needs to go to, as indicated by the user via the user input, and populate the intermediate distributed ledger. In some embodiments of the disclosure, the artificial intelligence engine may automatically generate the selection of data based on past user selections.

In some embodiments of the disclosure, the user input may comprise hypothetical questions from the user regarding the output generated by the artificial intelligence engine. The computer-readable medium may further comprise sets of codes for causing computing device(s) to generate an interface component comprising one or more hypothetical outputs in response to the hypothetical questions, transmit the interface component to the user device that comprises a graphical user interface, and trigger a configuration of the graphical user interface of the user device with the interface component. In other words, the hypothetical outputs and hypothetical answers are displayed to the user through the user device's graphical user interface.

Thus, according to embodiments of the disclosure, which will be discussed in greater detail below, the present disclosure provides for generating and dynamically adjusting artificial intelligence engine parameters in a distributed network. Specifically, the disclosure provides for identifying user data specific to a user or user account that it receives from the user or from external sources, analyzes the user data using an artificial intelligence engine and based on predefined parameters, and generates an output using the artificial intelligence engine based on the analysis. The disclosure further provides for generating a report detailing the analysis and/or the reasons for the output, transmits the report to a user device and receives user input such as a modification or addition to user data or request for further details, from the user and/or from external sources, in response to the report. The disclosure then uses the artificial intelligence engine to apply the user input to the predefined parameters and generate a new regenerated output and regenerated report based on the regenerated output and transmits the regenerated report back to the user device. This process may occur repeatedly until an outcome desired by the user is achieved. The artificial intelligence engine may automatically adjust the predefined parameters based on the user input. In some embodiments of the disclosure, the report and any regenerated reports may be transmitted to the user device in a distributed ledger environment. In further embodiments, the user may select data to be transferred from a primary distributed ledger to an intermediate distributed ledger to share the selected data with a third party. In some embodiments, the artificial intelligence engine may automatically select data for the intermediate distributed ledger based on who the data needs to be shared with. In some embodiments of the disclosure, the user input comprises hypothetical questions which the system or artificial intelligence engine can respond to by generating an interface component comprising the hypothetical outputs or answers, transmitting the interface component to the user device and triggering a configuration of the graphical user interface of the user device with the interface component, thus displaying the hypothetical output to the user through the user device.

The above summary is provided merely for purposes of summarizing some example embodiments to provide a basic understanding of some aspects of the present disclosure. The features, functions, and advantages that have been discussed may be achieved independently in various embodiments of the present disclosure or may be combined with yet other embodiments, further details of which can be seen with reference to the following description and drawings. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
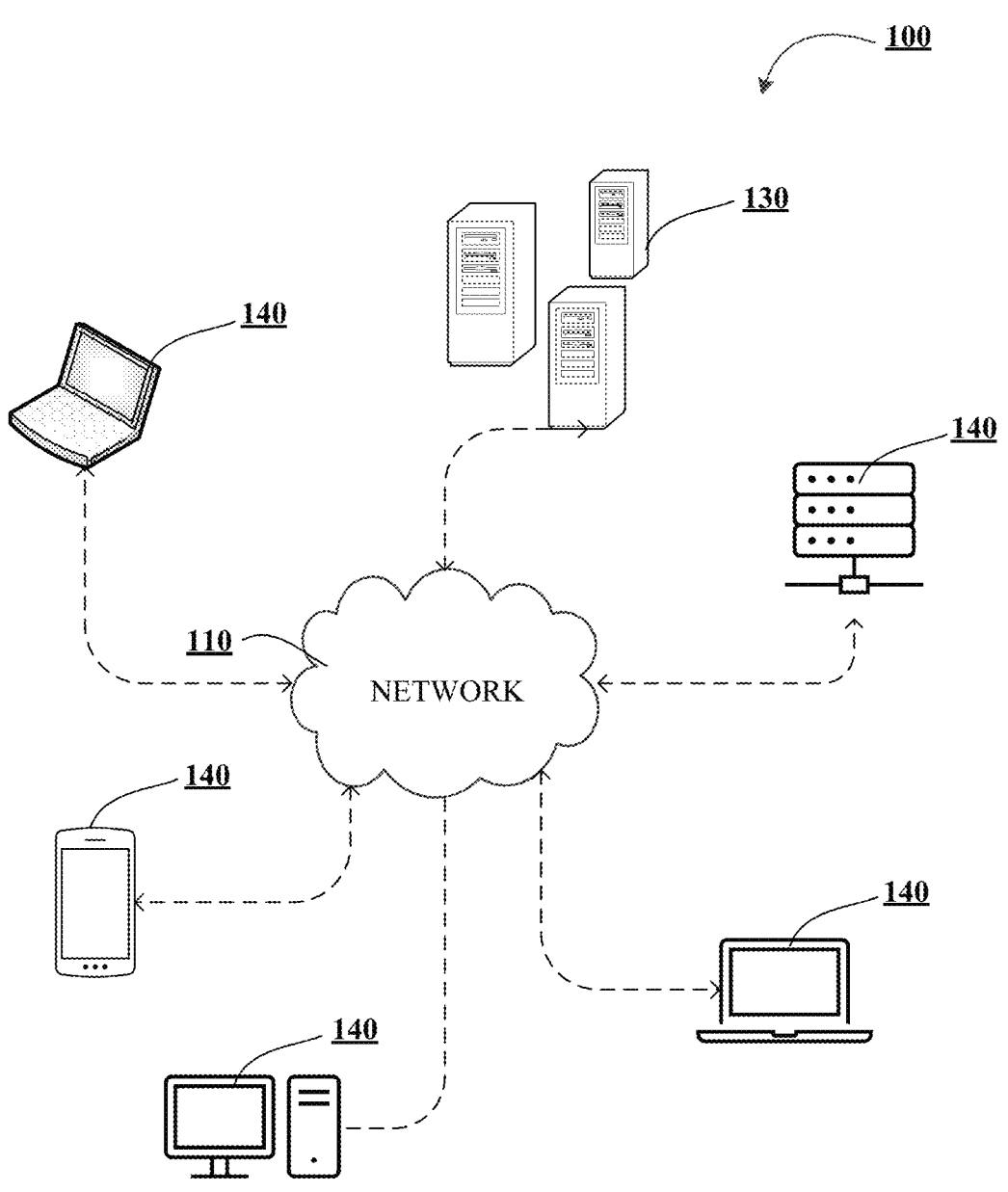
Figure 1B:
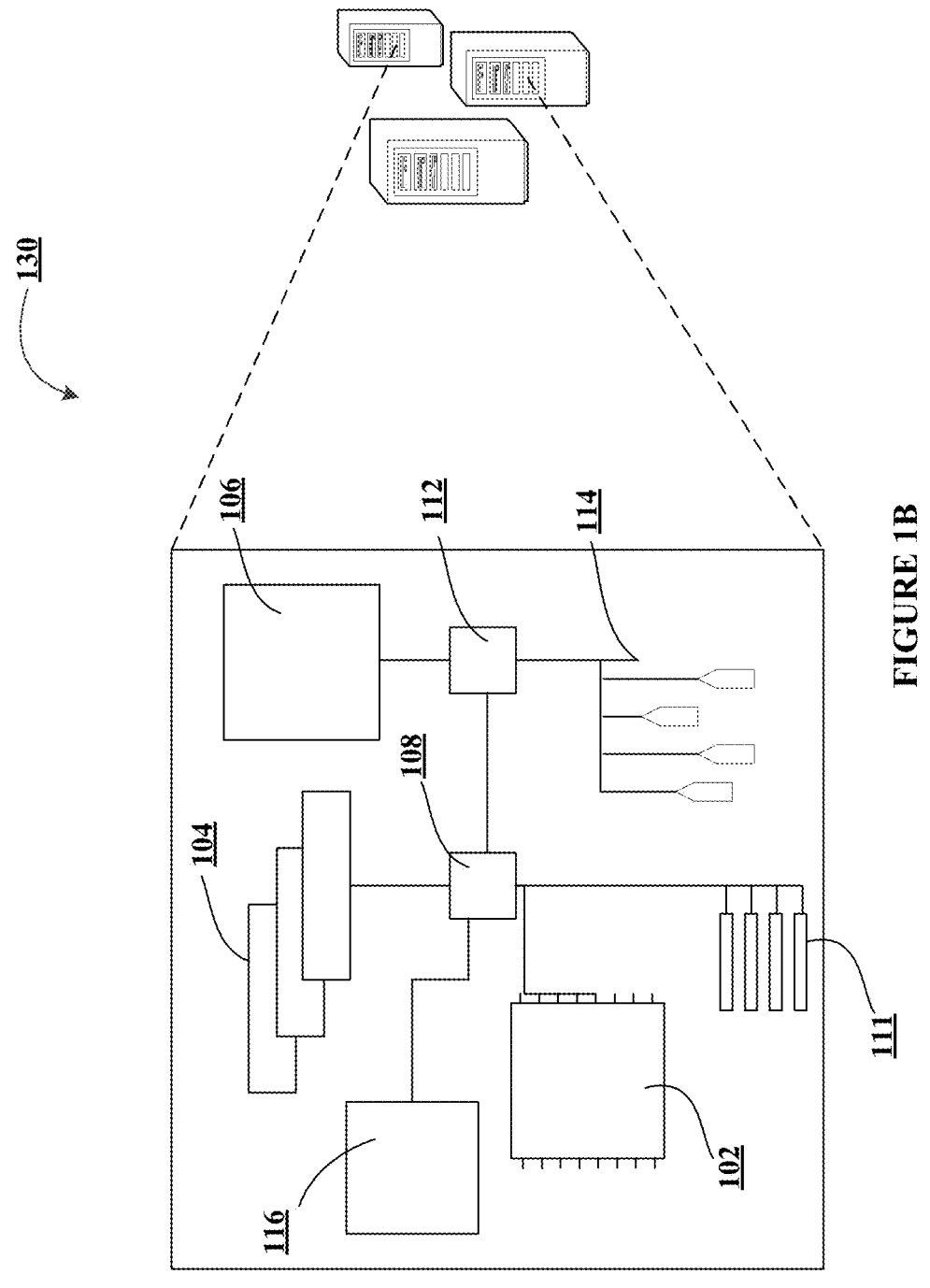
Figure 1C:
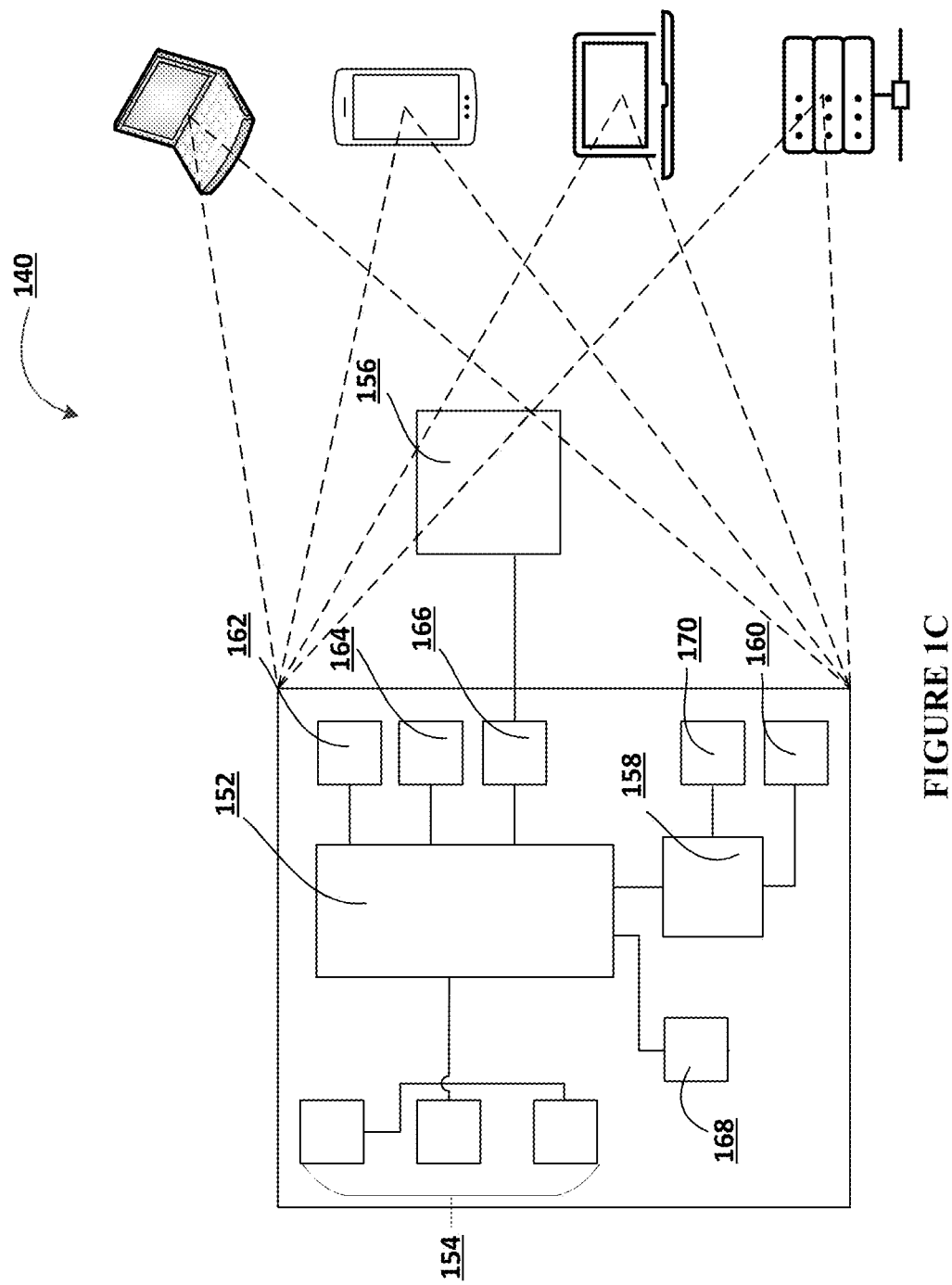
Figure 2:
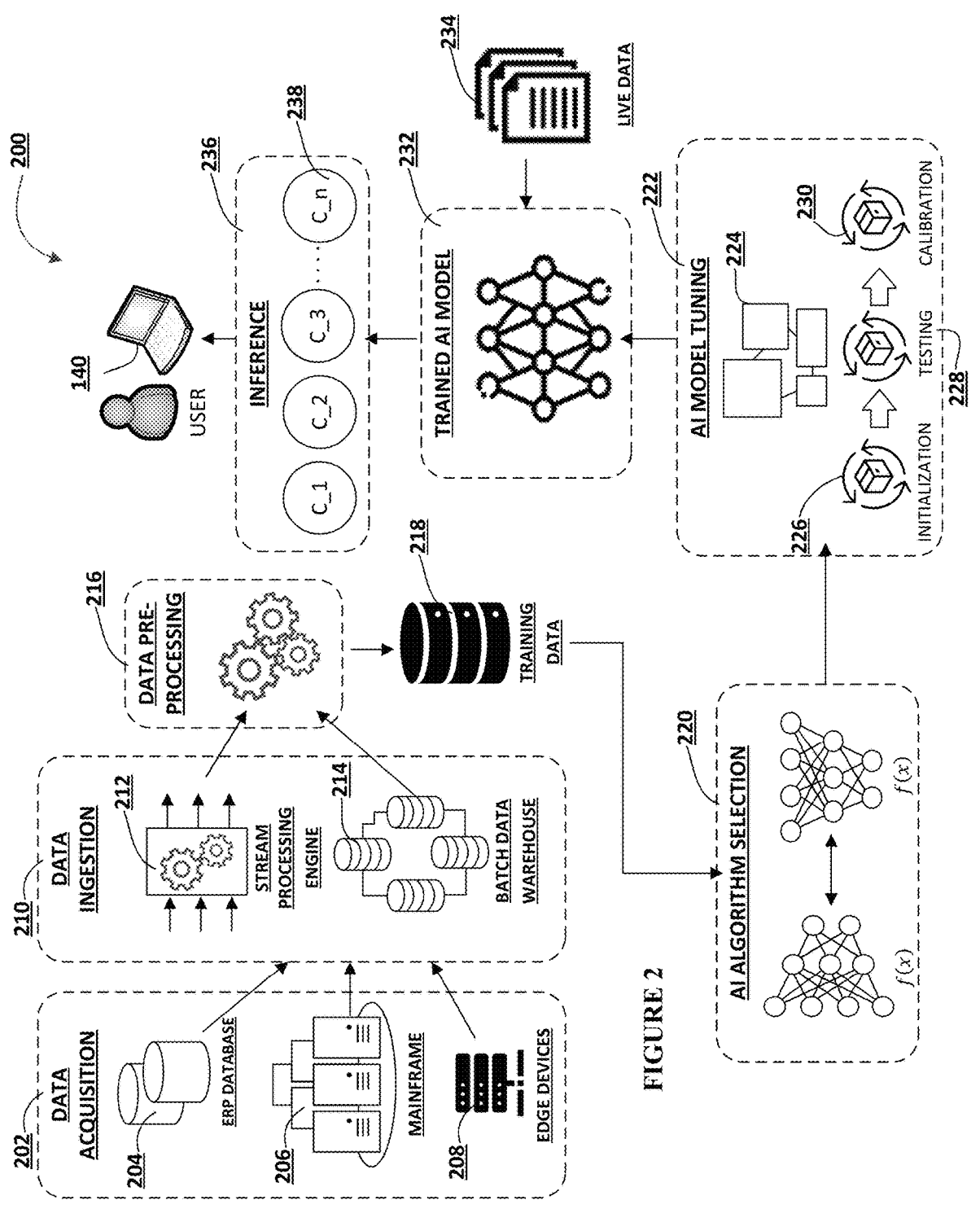
Figure 3A:
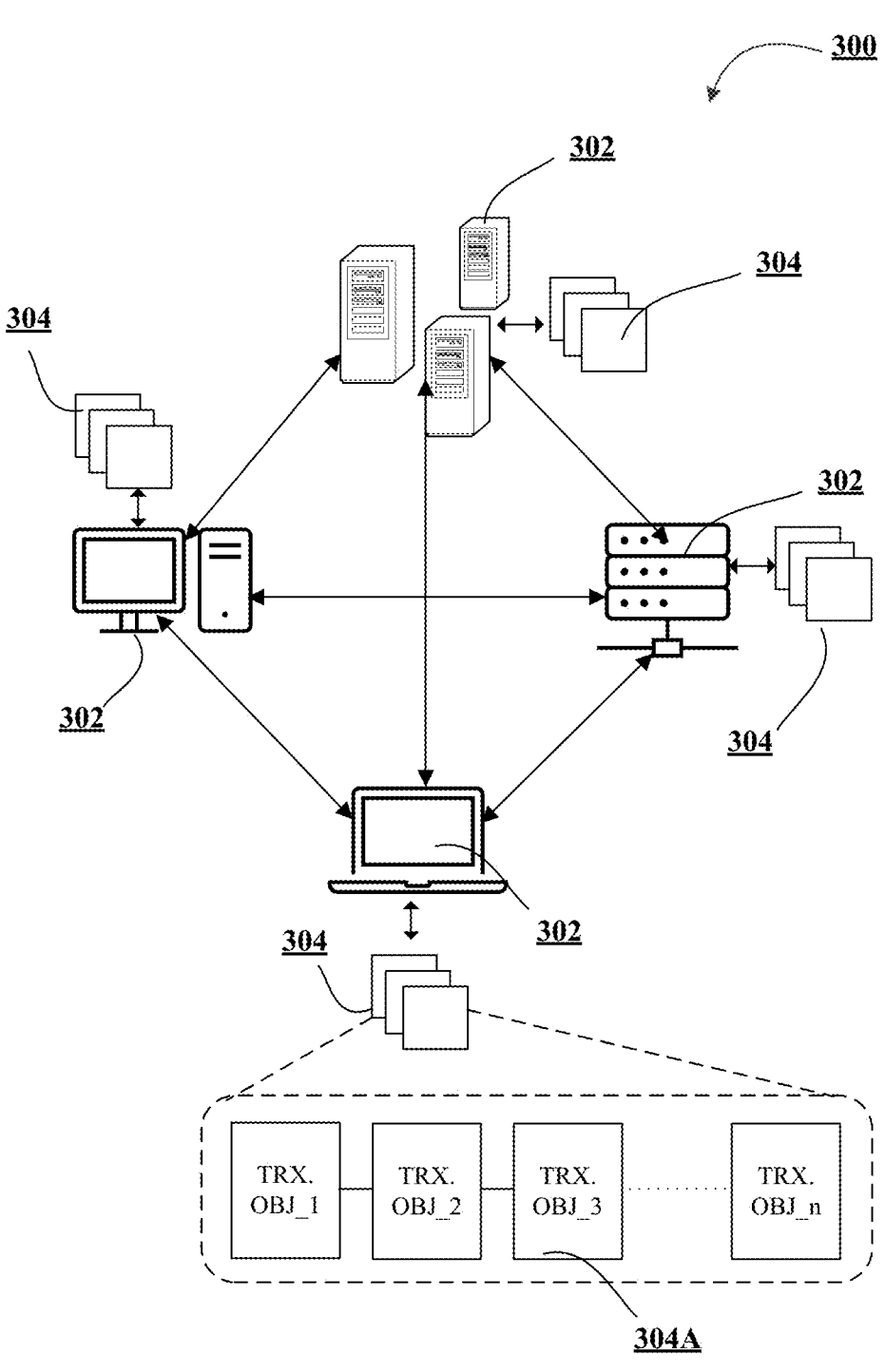
Figure 3B:
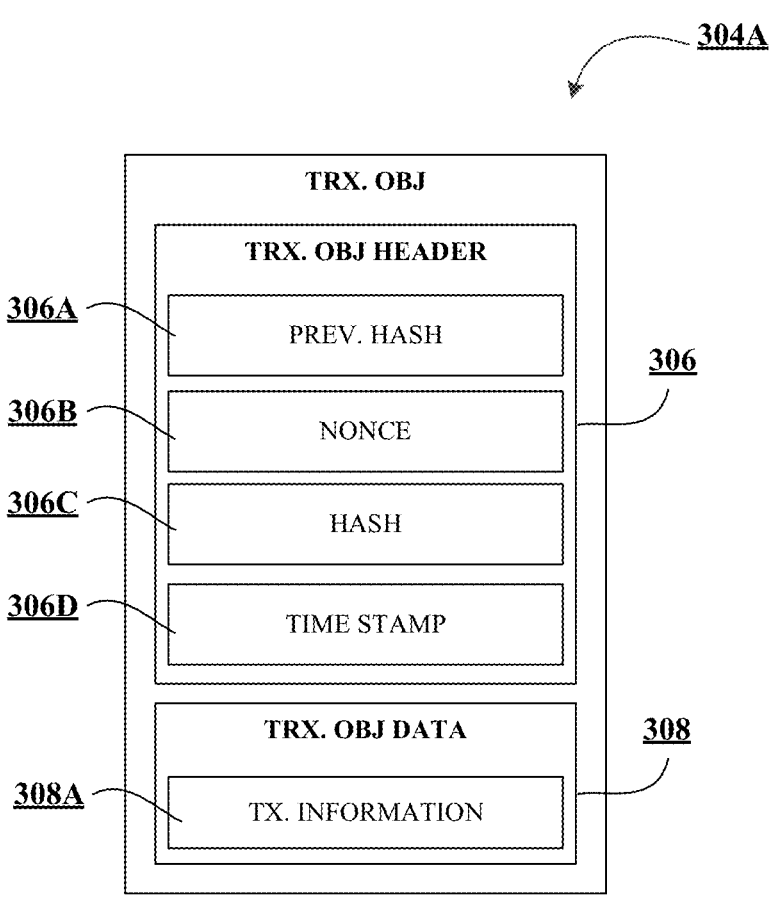
Figure 5:
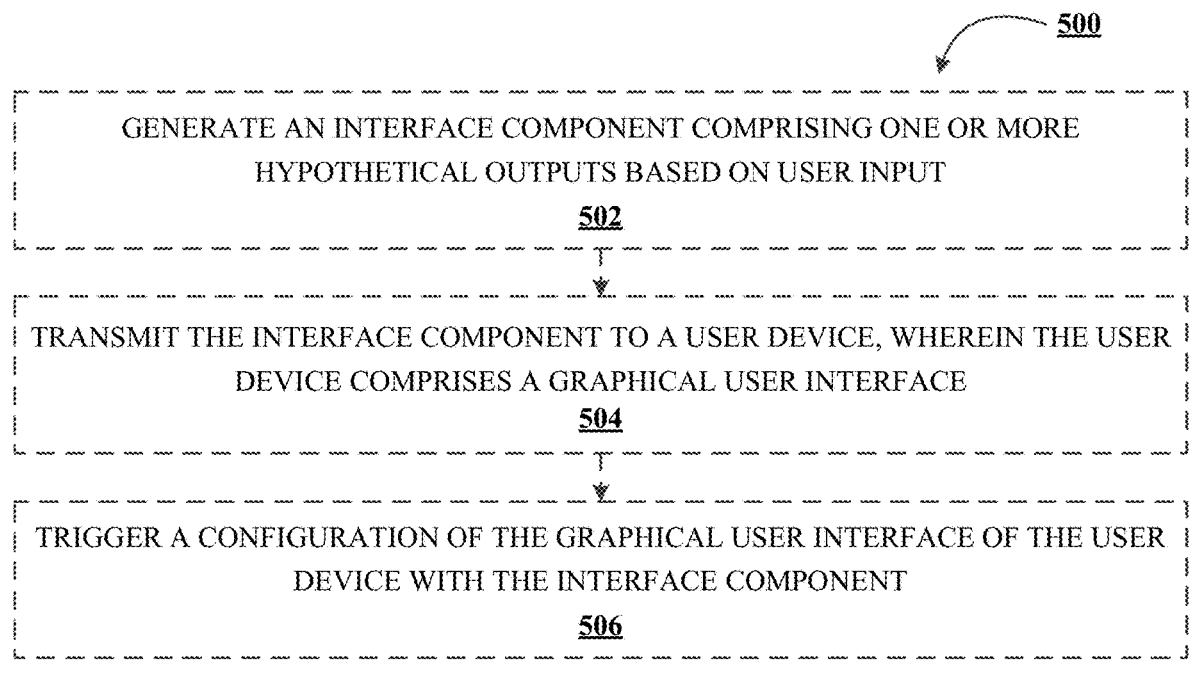

FIGS. 1A-1C illustrates technical components of an exemplary distributed computing environment for generating and dynamically adjusting artificial intelligence engine parameters in a distributed network, in accordance with an embodiment of the disclosure;

FIG. 2 illustrates an exemplary artificial intelligence (AI) subsystem architecture, in accordance with an embodiment of the disclosure;

FIGS. 3A-3B illustrate an exemplary distributed ledger technology (DLT) architecture, in accordance with an embodiment of the disclosure;

FIG. 4 illustrates a process flow for generating and dynamically adjusting artificial intelligence engine parameters, in accordance with an embodiment of the disclosure; and FIG. 5 illustrates a process flow for generating and displaying a user interface component, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As will be appreciated by one of skill in the art in view of this disclosure, the present disclosure may be embodied as a system, a method, a computer program product or a combination of the foregoing. Accordingly, embodiments of the present disclosure may take the form of an entirely hardware embodiment, an entirely software embodiment (including firmware, resident software, micro-code, etc.), or an embodiment combining software and hardware aspects that may generally be referred to herein as a "system." Furthermore, embodiments of the present disclosure may take the form of a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present disclosure may be written in an object oriented, scripted or unscripted programming language such as JAVA, PERL, SMALLTALK, C++, PYTHON or the like. However, the computer program code/computer-readable instructions for carrying out operations of the disclosure may also be written in conventional procedural programming languages, such as the "C" programming language or similar programming languages.

Embodiments of the present disclosure are described below with reference to flowchart illustrations and/or block diagrams of method or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable data processing apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the disclosure.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

According to embodiments of the disclosure, which will be described in more detail below, systems, methods and computer program products are disclosed that provide for generating and dynamically adjusting artificial intelligence engine parameters. Specifically, the disclosure provides for artificial intelligence-made decisions to be explained by the artificial intelligence engine making the decision.

Entities may use artificial intelligence in decision-making processes. For example, a bank may use artificial intelligence to decide on mortgage rates for an individual. Other examples may include a retailer using artificial intelligence for dynamic pricing of products or services, or a patient care organization using artificial intelligence to generate patient reports and securely send those reports to the patient. Using artificial intelligence to make decisions may present a number of problems, in no small part because of the "black box" nature of AI. The entities using AI for decision-making may not understand how or why the AI system made the decision that it did. Users impacted by the decision made by the AI may not understand the basis for the decision as well and as a result, may not be able to appeal the decision. This lack of understanding can extend to the datapoints or factors that the AI system considers in making the decision as well. Furthermore, there may be implicit bias built into artificial intelligence decision making, and without understanding how AI makes a decision, it can be difficult to track or eliminate such biases.

If an AI system generating the output also reports on its reasoning and the factors it considers and how it applied those factors in any instant case, the problems associated with "black box" AI decisions, as detailed above, may be alleviated. If entities and users understand how an AI system came to its decision, the entity can evaluate for implicit bias underlying the decision or any unfair practices implicated by how the AI system made the decision and work to address those problems. Further, if users or individuals affected by the decision can understand why the decision was made, they can generate amended user inputs to change the decision or argue/appeal the decision if necessary.

Accordingly, the present disclosure allows for an artificial intelligence engine to make a decision based on user data and provide a report explaining its decision to the user to give the user an opportunity to make changes or provide additional user inputs that may change the outcome. Specifically, the present disclosure provides for identifying user data received as initial user input or from external sources and analyzes the user data by an artificial intelligence engine based on certain predefined parameters that the artificial intelligence engine was initially trained with. The artificial intelligence engine then generates an output based on the analysis of the user data as well as a report detailing the analysis and/or explaining the reasons for the output. The report is sent to the user's device and the user can then respond to the report via new user input. In some embodiments of the disclosure, the entity providing users with access to the artificial intelligence engine may also receive the report and the output. The entity can evaluate the reports and make changes accordingly—by retraining the artificial intelligence engine, for example. In some embodiments, the user input may also come from external sources. User input may comprise, among others, one or more of a modification of the user data, additional user data, a request for further details, or hypothetical questions regarding the output. The artificial intelligence engine then applies the user input, along with the initial user data, to the predefined parameters to generate a regenerated output and a regenerated report based on the regenerated output. In some embodiments, the regenerated output and regenerated report may also be sent to the entity. In some embodiments of the disclosure, if the user input isn't particularly relevant to the predefined parameters, for example, the artificial intelligence engine may automatically adjust the predefined parameters to consider the user input. In some embodiments, the artificial intelligence engine may determine that the user input is not relevant to the predefined parameters and determine that a new output is not warranted. The user can provide user input and the artificial intelligence engine can generate regenerated outputs and regenerated reports multiple times until an output desired by the user is achieved or as many times as the user desires.

In some embodiments of the disclosure, the report and any regenerated reports are transmitted to the user in a distributed ledger environment. The user input may comprise a selection of data from the primary distributed ledger, through which the report is presented to the user, to be shared with a third party or entity through an intermediate distributed ledger. In some embodiments, the user input may comprise the third party or entity with whom information needs to be shared and the artificial intelligence engine may automatically generate the selection of data to be shared to populate the intermediate distributed ledger. In some embodiments of the disclosure, the system responds to hypothetical questions from the user by generating an interface component comprising one or more hypothetical outputs, transmitting the interface component to the user device, and triggering a configuration of the graphical user interface of the user device with the interface component. For example, in some embodiments, the disclosure may allow for an interaction between the artificial intelligence engine and the user to allow the user to request hypothetical results without the artificial intelligence engine generating a new, regenerated output and report.

What is more, the present disclosure provides a technical solution to a technical problem. As described herein, the technical problem includes unaccountable or inexplicable artificial intelligence outputs that may carry implicit bias or otherwise unacceptable processes. The technical solution presented herein allows for artificial intelligence outputs to be explained by artificial intelligence by reporting on the output and detailing the analysis that led to and the reasons for the output. In particular, a self-explaining artificial intelligence engine is an improvement over existing solutions to the current black box nature of artificial intelligence decision making, (i) with fewer steps to achieve the solution, thus reducing the amount of computing resources, such as processing resources, storage resources, network resources, and/or the like, that are being used (e.g., the artificial intelligence engine may provide hypothetical outputs or answers to the user such that the output may not have to be regenerated multiple times); (ii) providing a more accurate solution to problem, thus reducing the number of resources required to remedy any errors made due to a less accurate solution (e.g., by dynamically and automatically adjusting parameters based on user input, the artificial intelligence engine provides an accurate output based on as much information as possible); (iii) removing manual input and waste from the implementation of the solution (e.g., the parameters do not need to be adjusted manually because the artificial intelligence engine is trained to automatically adjust the parameters and, by producing the report, explains the parameters to the user as well); thus improving speed and efficiency of the process and conserving computing resources, (iv) determining an optimal amount of resources that need to be used to implement the solution, thus reducing network traffic and load on existing computing resources (e.g., determining whether some user input is relevant to the generation of the output). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for generating and dynamically adjusting artificial intelligence engine parameters in a distributed network 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary generative AI subsystem 200, in accordance with an embodiment of the invention. The generative AI subsystem 200 may include a data ingestion engine 202, a data pre-processing engine 204, a model training engine 206, and a loss function and optimization engine 208. It should be understood that the generative AI subsystem 200 is merely an example, and other embodiments may include more, fewer, or different components depending on the specific requirements and implementations of the system. For instance, additional engines for data validation, feature selection, or distributed computing may be integrated into the subsystem, or certain components described herein may be consolidated or omitted based on system performance objectives. Therefore, the generative AI subsystem 200 should not be considered limiting and may be adapted to various configurations within the scope of the invention.

The data ingestion engine 202 may identify various internal and/or external data sources to generate, test, and/or integrate new features for training the generative AI model. These internal and/or external data sources may be initial locations where the data originates or where physical information is first digitized. In addition to conventional data sources, the data ingestion engine 202 may support decentralized storage systems, such as blockchain-based data sources, and privacy-preserving methods such as differential privacy. The data ingestion engine 202 may identify the location of the data and describe connection characteristics for access and retrieval of data. In some embodiments, data is transported from each data source using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like.

Depending on the nature of the data, the data ingestion engine 202 may move the data to a destination for storage or further analysis. Typically, the data may be in varying formats as they come from different sources, including RDBMS, other types of databases, S3 buckets, CSVs, or from streams. Since the data comes from different places, it needs to be cleansed and transformed so that it can be analyzed together with data from other sources. The data may be ingested in real-time, using stream processing, in batches using a batch data warehouse, or a combination of both. Stream processing may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse collects and transfers data in batches according to scheduled intervals, trigger events, or any other logical ordering.

In machine learning, the quality of data and the useful information that can be derived therefrom directly affects the ability of the machine learning model to learn. The data pre-processing engine 204 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed. In some embodiments, the data pre-processing engine 204 may perform real-time pre-processing at the edge via edge computing devices, allowing for the transformation and reduction of data prior to transmission to centralized locations, thereby reducing latency and conserving network bandwidth.

In addition to improving the quality of the data, the data pre-processing engine 204 may transform categorical data into numerical formats that are suitable for machine learning algorithms. In this regard, the data pre-processing engine 204 may use techniques such as one-hot encoding or label encoding depending on the nature of the categorical variables and the intended use of the data.

In some embodiments, the data pre-processing engine 204 may also include dimensionality reduction techniques, where the number of input features is reduced while retaining the most relevant information. In this regard, the data pre-processing engine 204 may include methods such as Principal Component Analysis (PCA) or apply feature selection algorithms to remove redundant or irrelevant features, thereby reducing the computational complexity of the model training phase. Feature selection may be particularly beneficial in datasets with a high number of features, ensuring that the generative AI models do not overfit to noise or irrelevant details. The pre-processed data output from the data pre-processing engine 204 may then be fed into the model training module 206.

The model training engine 206 may be responsible for training the generative AI models using the pre-processed data from the data pre-processing engine 204. The model training engine 206 may implement various machine learning algorithms, including but not limited to Generative Adversarial Networks (GANs), Variational Autoencoders (VAEs), or other generative models, depending on the specific requirements of the system. The model training engine 206 may optimize these models by continuously adjusting their internal parameters based on the patterns and relationships identified within the data.

In some embodiments, the model training engine 206 may include a training data handler, which manages the partitioning of the pre-processed data into training, validation, and testing datasets. The training data is used to update the model's parameters, while the validation and testing datasets are reserved to evaluate the model's performance during and after training. The model training engine 206 may support various data-handling strategies, such as cross-validation or random shuffling, to ensure that the model generalizes well and is not overfitting to the training data.

For VAEs, the model training engine 206 may implement an encoder-decoder architecture. In this architecture, the encoder is responsible for compressing or mapping the input data into a lower-dimensional latent space representation, capturing the essential features of the input data while discarding unnecessary details. The decoder, in turn, reconstructs the input data from this latent representation, aiming to recreate the original data as closely as possible. During training, the VAE model seeks to minimize a loss function that typically consists of two components: reconstruction loss and Kullback-Leibler (KL) divergence loss.

The reconstruction loss ensures that the difference between the original input and the reconstructed output is minimized, guiding the decoder to generate outputs that closely resemble the input data. The second component, KL divergence loss, regularizes the latent space by ensuring that the distribution of latent variables conforms to a predefined probabilistic distribution, often a Gaussian distribution. This constraint encourages the model to learn a well-organized and smooth latent space, allowing for meaningful sampling from this space during inference. By combining these loss functions, the VAE can learn a latent space that not only captures the underlying patterns in the data but also allows for the generation of novel outputs by sampling new points from this space. During the inference phase, the trained model can sample random points from the latent space to generate new, previously unseen data instances.

In embodiments using GANs, the model training engine 206 may train two distinct but interconnected networks: the generator and the discriminator. The generator network is responsible for generating synthetic data samples, typically starting from random noise vectors or points sampled from a latent space. The generator's objective is to learn how to map this random input into realistic data that closely resembles the actual data distribution from the training set, such as images, financial plans, or any other domain-specific data. On the other side, the discriminator network is tasked with differentiating between the real data—coming directly from the training set—and the synthetic data generated by the generator. The discriminator acts as a binary classifier, aiming to correctly classify whether the input data is real or fake. Its job is to improve its accuracy over time in detecting whether the data it is evaluating comes from the true data distribution or has been synthetically created by the generator.

The training process of a GAN is adversarial in nature, where the two networks engage in a zero-sum comparison. The generator continuously tries to improve its ability to generate convincing data, while the discriminator simultaneously improves its capacity to distinguish between real and generated data. During each training iteration, the generator attempts to "fool" the discriminator by creating more realistic data samples, while the discriminator receives feedback to better catch fake data. This adversarial feedback loop leads both networks to improve their performance over time. The loss functions for both networks guide this competition: the generator's loss reflects how well it was able to fool the discriminator, while the discriminator's loss reflects how accurately it classified real versus generated data. Through this iterative, competitive process, the generator becomes increasingly skilled at producing highly realistic data samples that are difficult for the discriminator to differentiate from real data. Eventually, the generator learns to generate synthetic data that is nearly indistinguishable from the real data.

The model training engine 206 may include a parameter optimization module, which may optimize the model's parameters using gradient-based optimization techniques such as stochastic gradient descent (SGD), Adam, or other suitable algorithms. The optimization process may minimize the loss function calculated during each training iteration (or epoch), adjusting the weights and biases of the model to improve its ability to learn from the data. The parameter optimization module may also dynamically adjust learning rates, momentum, and other hyperparameters to further enhance training efficiency.

In some embodiments, the model training engine 206 may implement early stopping mechanisms to prevent overfitting. Early stopping monitors the generative AI model's performance on the validation dataset, halting the training process if the performance does not improve after a specified number of iterations. This ensures that the generative AI model does not continue training on noise or irrelevant patterns, which could degrade its performance on unseen data. The model training engine 206 may also support distributed training across multiple computing nodes, allowing the system to scale its computational resources as needed. Distributed training may involve splitting the generative AI model and data across multiple machines or GPUs, where each node processes a portion of the data and updates the model in parallel. This is particularly useful for large datasets or models that require significant computational power, such as deep generative models. The model training engine 206 may synchronize the updates across the nodes using techniques like synchronous or asynchronous gradient descent.

Once the generative AI model is trained, the model training engine 206 may save the final trained generative AI model in a persistent storage location for future use. In specific embodiments, metadata such as the number of epochs, the final loss values, and values of learned parameters may be logged for model versioning and/or retraining at a later stage. In some embodiments, the model training engine 206 may also implement transfer learning, where a pre-trained model is fine-tuned on a smaller, domain-specific dataset. This may reduce the amount of time and data required to train a new model, especially in cases where the available data is limited or highly specialized. The model training engine 206 may adjust the parameters of the pre-trained model to better align with the new dataset, while preserving the learned features from the original training.

In embodiments where a VAE is used to train the generative AI model, generating new output involves providing an input to the trained model in the form of a point or distribution in the latent space. During training, the encoder network learned to compress input data into this latent space, while the decoder learned to map points from the latent space back into meaningful data. To generate new data, the system may sample a point from the latent space, typically by sampling from a predefined distribution (e.g., a Gaussian distribution), or a user may provide specific coordinates within the latent space to control the nature of the output. The decoder network then transforms this latent vector into a new data instance (e.g., an image or piece of text) that conforms to the patterns learned during training. Since the latent space has been structured to capture the key features of the input data, small variations in the latent space coordinates may result in new data with slight variations, allowing the system to produce diverse but coherent outputs.

In embodiments where the generative AI model has been trained using a GAN, the process for generating new output also involves providing an input in the form of a random noise vector sampled from the latent space. Unlike VAEs, where the latent space is learned explicitly during training, GANs use this latent space as a starting point for the generator to produce new data. The trained generator network takes the random input vector and transforms it into a new data sample, such as an image, based on the patterns it has learned during training. The discriminator is no longer needed in this phase, as its role was limited to training. Once the generator has been trained to produce realistic outputs, it can generate new data by mapping random noise vectors to complex data points that resemble the original dataset. For example, in a GAN trained on images of landscapes, providing a random vector in the latent space will result in the generation of a new, never-before-seen landscape that adheres to the patterns the generator learned during training. The latent space in GANs encodes abstract features of the data, and small adjustments to the noise vector allow users to control specific aspects of the generated data, such as color, shape, or texture, enabling the generation of highly varied outputs.

It will be understood that the embodiment of the generative AI subsystem 200 illustrated in FIG. 2 is exemplary and that other embodiments may vary. The generative AI subsystem 200, as well as its constituent elements, may vary, and modifications or alternative configurations may be implemented without departing from the broader scope of the invention. For instance, different machine learning algorithms, data sources, optimization techniques, or training methodologies may be employed depending on system requirements, application domain, and available computational resources. Furthermore, features and functionalities described in one embodiment may be combined with those of another embodiment as needed, and vice versa.

FIGS. 3A-3B illustrate an exemplary distributed ledger technology (DLT) architecture, in accordance with an embodiment of the disclosure. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 3A, the exemplary DLT architecture 300 includes a distributed ledger 304 being maintained on multiple devices (nodes) 302 that are authorized to keep track of the distributed ledger 304. For example, these nodes 302 may be computing devices such as system 130 and client device(s) 140. One node 302 in the DLT architecture 300 may have a complete or partial copy of the entire distributed ledger 304 or set of transactions and/or transaction objects 304A on the distributed ledger 304. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 3B, an exemplary transaction object 304A may include a transaction header 306 and a transaction object data 308. The transaction header 306 may include a cryptographic hash of the previous transaction object 306A, a nonce 306B—a randomly generated 32-bit whole number when the transaction object is created, cryptographic hash of the current transaction object 306C wedded to the nonce 306B, and a time stamp 306D. The transaction object data 308 may include transaction information 308A being recorded. Once the transaction object 304A is generated, the transaction information 308A is considered signed and forever tied to its nonce 306B and hash 306C. Once generated, the transaction object 304A is then deployed on the distributed ledger 304. At this time, a distributed ledger address is generated for the transaction object 304A, i.e., an indication of where it is located on the distributed ledger 304 and captured for recording purposes. Once deployed, the transaction information 308A is considered recorded in the distributed ledger 304.

FIG. 4 illustrates a process flow 400 for generating and dynamically adjusting artificial intelligence engine parameters in a distributed network, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400.

As shown in block 402, the process flow 400 may include the step of identifying user data associated with a user account. User data may vary based on the use of the artificial intelligence engine. For example, if the system or the artificial intelligence engine is used to determine mortgage rates for a user, user data may comprise various financial and personal data related to the user, such as information regarding the user's financial standing or trustworthiness, address, and the like. A user account is the mechanism through which the user's identity may be verified or authenticated. For example, the user may log into the user account using a username and password. In some embodiments, the user account may be activated with a unique identifier of the user, such as the user's social security number. By way of nonlimiting example, identifying user data associated with a user account may work as follows: a specific user logs into their user account and the system pulls all data associated with the user that is relevant to the artificial intelligence engine's decision-making process. In some embodiments of the disclosure, the artificial intelligence engine is developed with certain predefined parameters to base output generation on and is trained on data relevant to the predefined parameters, such that the artificial intelligence engine can determine what user data is needed to generate an accurate output (i.e., what data is relevant). In some embodiments of the disclosure, the user data may be received from the user by requesting initial user input. In some embodiments, the artificial intelligence engine may request certain user data from the user, based on the predefined parameters. In some embodiments, the user data may be pulled from external sources associated with the user. For example, a user's social media account could be an external source associated with the user that the system collects user data from.

As shown in block 404, the process flow 400 may include the step of analyzing the user data. The user data is analyzed by the artificial intelligence engine based on one or more predefined parameters. The predefined parameters are those parameters that the artificial intelligence engine bases its decision on. For example, where the artificial intelligence engine is developed for or used to determine mortgage rates for a specific user, the predefined parameters may comprise, among others, the user's financial standing or trustworthiness, the cost of the property the mortgage rate is for, any downpayment, and the like. As another non-limiting example, where the artificial intelligence engine is developed for and used to generate patient reports in a patient care setting, the predefined parameters may comprise patient information, test results, and the like. In some embodiments, certain predefined parameters may be marked as sensitive, such that sensitive data requires additional authentication to be transmitted to the user, as described below. In some embodiments, the artificial intelligence engine may have been developed with the predefined parameters. In some embodiments, the entity making the artificial intelligence engine available to users may provide the artificial intelligence engine with the predefined parameters to use in generating the output. The entity may periodically add, remove, or modify the parameters. In some embodiments, where the artificial intelligence engine dynamically and automatically adjusts the parameters, as described further below, the entity may add to, remove, or modify the parameters as adjusted by the artificial intelligence engine. Additionally, and in some embodiments, the artificial intelligence engine may have been initially trained on data using the predefined parameters.

As shown in block 406, the process flow 400 may include the step of generating an output based on the analysis of the user data. In some such embodiments, the artificial intelligence engine generates the output. In some embodiments of the disclosure, the output comprises the decision made by the artificial intelligence engine by applying the user data to the predefined parameters. In some embodiments, the output may be transmitted to a user device for the user's review. In some embodiments, the output may be transmitted to the entity that created and made the artificial intelligence engine available to the user. For example, if a bank is making the system available to users to determine mortgage rates, the determined mortgage rate, i.e., the output, may be transmitted to the user, the bank, or both.

As shown in block 408, the process flow 400 may include the step of generating a report. The artificial intelligence engine generates the report, and the report comprises information on at least one of analysis of the user data for each of the predefined parameters or one or more reasons for the output. In other words, the report may explain to the user how and/or why the artificial intelligence engine generated the output that it did. For example, and in some embodiments, analysis of the user data for each of the predefined parameters may comprise a detailed description of how each element of the user data was applied to the predefined parameters. A more specific example may be when a predefined parameter is the normal range for a test in a patient care setting and one element of the user data is the user's test result, the analysis may include how the user's test result fares as compared to the normal range. In the same patient care example, the output generated may be whether the patient requires further tests, and that output may hinge on certain test results. In that case, the reason(s) for the output may comprise a statement that the patient/user does require further testing because of the certain test results or that no further testing is required because all test results were within normal ranges.

In some embodiments, the report also comprises the output. In some embodiments, the report may comprise the analysis of the user data for the parameters relevant to the reason for the output. The analysis of the user data for the parameters relevant to the reason for the output, in the example above, may comprise more than just a statement that further testing is required because of the certain test results, but also include a discussion/analysis of those certain test results with respect to the predefined parameters relevant to those tests. In some embodiments, the artificial intelligence engine automatically determines the contents of the report based on the user or based on the output. For example, in the example above, if all the user test results are normal and no further testing is required, the artificial intelligence engine may determine that the report just includes the statement that all test results are normal and no further testing is required instead of a full report on the analysis of all the user data which would essentially go through each test result and say its normal.

As shown in block 410, the process flow 400 may include the step of automatically transmitting the report to the user device. Transmitting the report may comprise breaking down the report into smaller segments of data, translating those segments into bits, and routing the translated segments, via a network device, like a router for example, to the destination. The receiving device can then put the segments back together to get the report. In some embodiments of the disclosure, transmitting the report may comprise displaying the report to the user through the user device's graphical user interface, which is described in greater detail below with respect to FIG. 5. In some embodiments, transmitting the report may comprise sending a copy of the report via email to the user's email account. In some embodiments, transmitting the report may comprise making the report available for download in the user account. In some embodiments, the report may be transmitted in any one or more of the methods outlined in this paragraph. Furthermore, in some embodiments of the disclosure, the report may also be transmitted to the entity or individual using the artificial intelligence engine for decision-making.

As shown in block 412, the process flow 400 may include the step of receiving at least one user input in response to the report. The user input may comprise, among others, a modification of the user data, additional user data, request for further details on the report or outcome, or hypothetical questions regarding the report or outcome. In some embodiments of the disclosure, the user responds to the report through some graphical user interface of the user device and the responses or interactions at the graphical user interface are captured as user inputs in response to the report. For example, in some embodiments, the user input may be entered on the system by typing in text, uploading an image, uploading a file, and/or the like, and whatever was entered may be first stored in one or more variables within an application of the system. The user input stored within the application may then be transmitted within the system to the artificial intelligence engine, which can then process the user input as described herein. In some embodiments of the disclosure, the system may prompt the user for user input. In some embodiments, the user may provide user input without any prompts from the system. In some embodiments, the user input may be collected from external sources associated with the user. For example, if the user's social media activity is one of predefined parameters, the user may make change a social media account of the user. Further, and for example, the system may pull, with the user's permission—in the case of private social media accounts—the user's social media activity from the relevant social media platform. The social media platform would be the external source and the user's social media account would be the source associated with the user. In some embodiments, and in the case of the social media account, the user input directly from the user (e.g., the user types it into a text box) may just indicate that social media account was altered, and the system may check only the social media account for the changes made to regenerate the output. In some embodiments, the system may just pull from the same sources as it received the initial user data to check for any changes to regenerate the output, and the social media account may just be one of them.

As shown in block 414, the process flow 400 may include the step of generating a regenerated output based on the at least one user input. The artificial intelligence engine generates the regenerated output by applying the user input to the one or more predefined parameters. In some embodiments of the disclosure, the artificial intelligence engine re-analyzes the user data (e.g., initial user data) along with the user input to generate a new decision. In some embodiments of the disclosure, the user input may not apply to the predefined parameters and the artificial intelligence engine may automatically adjust the parameters to consider the user input. For example, in the patient test result scenario, predefined parameter may include data on a normal range for a particular test and the user data may include the user's/patient's test result. If the user's test result was abnormal, the artificial intelligence engine may generate an output indicating further tests are required. However, if for example, the user provides as user input additional information that the user was traveling and didn't take a medication that would have kept that particular test result in the normal range and was now back on the medication, the artificial intelligence engine may determine that though the predefined parameter suggests the test result should be abnormal, further testing is not required because the test result was explained by the user.

In some embodiments, the artificial intelligence engine may determine that the user input is not relevant to the decision and would not need to adjust the parameters to consider the user input. For example, in some embodiments, user input may be irrelevant to the decision if it does not fit into any of the predefined parameters nor can it inform or explain any of the predefined parameters. In the patient care example above, for example, if the user provides as user input, the user's favorite color, that may not fit any of the predefined parameters nor could it explain, expand on, or otherwise inform or impact the predefined parameters or the generation of the output. The artificial intelligence engine could make that relevancy determination based on the data it was trained on and by learning from the various iterations of user input and output generation the artificial intelligence engine engages in. In that case, the regenerated output and the regenerated report may be the same as the initial output and report to indicate that there was no change or the regenerated report may comprise further information on why the user input did not affect the output (e.g., explain that the user input did was not relevant to any of the parameters used to generate an output).

As shown in block 416, the process flow 400 may include the step of automatically transmitting, to the user device, a regenerated report. For example, the artificial intelligence engine generates a regenerated report based on the regenerated output. The regenerated report, like the initial report, may comprise details of the analysis of the user data and the user input for each of the predefined parameters and/or the reasons for the regenerated output. The regenerated report may be transmitted to the user device by any of the methods described above. In some embodiments, if the regenerated output and the regenerated report are the same as the initial output and report, the system may alert the user that there was no change instead of transmitting the report to the user device. In some embodiments of the disclosure, the steps shown in blocks 412-416 may be repeated until an output desired by the user is achieved. In some embodiments, the user may indicate via user input that a desired output has been achieved. In some embodiments, the user may indicate that a desired output has been achieved by not providing any user input. In some embodiments, the user may indicate that a desired output has been achieved by ending use of the system.

In some embodiments of the disclosure, the report and any regenerated report or output that needs to be transmitted to the user device is transmitted to the user device in a distributed ledger environment. Distributed ledger technology includes a secure method of transferring data, a key feature of which is the decentralized storage of data. In some embodiments, the user, via user input, can select data from a primary distributed ledger through which the report is transmitted to the user as an intermediate distributed ledger to share the selected data with a third party or entity. By sharing select data through an intermediate distributed ledger, the user can ensure the secure and accurate transfer of the selected data as well as ensure the security of the primary distributed ledger. In some embodiments of the disclosure, the artificial intelligence engine automatically generates a selection of data for the intermediate distributed ledger to be shared with a third party or entity. The artificial intelligence engine may generate the selection of data based on the third party or entity indicated by the user, and the user may indicate the third party or entity with which data needs to be shared via user input. For example, in the patient care scenario, if a user had multiple test results, including an x-ray for a broken bone and a test for anemia, and the user needed to share data with an orthopedic surgeon, the artificial intelligence engine's generation of the selection of data may comprise the x-ray results but not the anemia results because that is the test result relevant for an orthopedic surgeon. In some embodiments, an artificial intelligence engine used in a patient care setting may have been trained on data indicating different specialties and areas of expertise, for example. The artificial intelligence engine may also generate a selection of data based on past user selections. For example, if a user selects a particular test result to share with a particular third party multiple times, the artificial intelligence engine may start to auto-populate the intermediate ledger to be shared with that particular third party whenever that particular test result is received. In some embodiments, the artificial intelligence may request approval from the user to populate the intermediate ledger.

FIG. 5 illustrates a process flow 500 generating and displaying a user interface component, in accordance with an embodiment of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500. In some embodiments of the disclosure, the user input may comprise one or more hypothetical questions about the output. In response to hypothetical questions from the user, the artificial intelligence engine may generate a hypothetical output.

As shown in block 502, the process flow 500 may include the step of generating an interface component comprising one or more hypothetical outputs based on the user input. An interface component is an element or module within a graphical user interface that displays certain content. In this case, the interface component may be an element that displays the hypothetical output. In some embodiments, the interface component may be an element that displays the regenerated output. In some embodiments of the disclosure, the artificial intelligence engine may produce a hypothetical output based on the user's hypothetical question by estimating or approximating an output that would take into account any additional information provided by the user in the hypothetical question. In this way, the hypothetical output can be shown to the user without the artificial intelligence engine having to generate an output or a regenerated output. For example, in the mortgage rates example, the user may ask a hypothetical question about what the mortgage rate would be if the user's financial report was better. The artificial intelligence engine could approximate a hypothetical output without pulling the user's credit report again, but instead considering the information about the credit report the user provided in the hypothetical question. The artificial intelligence engine may only change the information provided by the user in the hypothetical question and keep the rest of the user data the same to provide the hypothetical output. In some embodiments, the artificial intelligence engine produces a hypothetical output based on the initial user data and any additional information provided by the user in the hypothetical question.

As shown in block 504, the process flow 500 may include the step of transmitting the interface component to a user device. The user device comprises a graphical user interface. In some embodiments, the interface component generated by the step shown in block 502 is sent to the graphical user interface of the user device and the user device is the device on which the content of the interface component is to be displayed. The interface component may be sent to the graphical user interface by first breaking it up into smaller segments, translating the segments into bits and routing the translated segments, via a networking device like a router for example, to the graphical user interface of the user device. In some embodiments of the disclosure, the user device may be a user device associated with the user or individual that is using the system or artificial intelligence engine. In some embodiments, the user device may be a user device associated with an entity that developed the artificial intelligence engine or the entity making the artificial intelligence engine available to the users.

As shown in block 506, the process flow 500 may include the step of trigger a configuration of the graphical user interface of the user device with the interface component. In some embodiments, the graphical user interface of the user device is refreshed to include the interface component that comprises the hypothetical output for the user to see. In some embodiments of the disclosure, the hypothetical output may be displayed to the user as a pop-up notification. In such a case, the graphical user interface may be automatically reconfigured to show the data of the interface component as the interface component is received by the user device. In some embodiments, the interface component with the hypothetical output may be superimposed over other interface components of the graphical user interface.

Through the steps shown in blocks 502-506 of the process flow 500, for example, and in some embodiments, the user can ask the artificial intelligence engine how the output may change if the user modifies the user data or provides additional user data and the artificial intelligence engine can show the user, through a graphical user interface, how the output would change, without generating a regenerated output and regenerated report (e.g., using the hypothetical output). A more specific example may be the user asking the artificial intelligence engine if deleting the user's social media accounts would affect the output, without deleting the user's social media accounts. The artificial intelligence engine can then provide a hypothetical answer and hypothetical output, without collecting data from the social media platform about the user's social media account status.

Thus, present embodiments of the disclosure discussed in detail above, the present disclosure provides for generating and dynamically adjusting artificial intelligence engine parameters in a distributed network to provide insight into artificial intelligence output. Specifically, the present disclosure provides for generating and dynamically adjusting artificial intelligence engine parameters in a distributed network. Specifically, the disclosure provides for identifying user data specific to a user or user account that it receives from the user or from external sources, analyzes the user data using an artificial intelligence engine and based on predefined parameters, and generates an output using the artificial intelligence engine based on the analysis. The disclosure further provides for generating a report detailing the analysis and/or the reasons for the output, transmits the report to a user device and receives user input such as a modification or addition to user data or request for further details, from the user and/or from external sources, in response to the report. The disclosure then provides for using the artificial intelligence engine to apply the user input to the predefined parameters and generate a new regenerated output and/or regenerated report based on the regenerated output and transmits the regenerated report back to the user device. This process may occur repeatedly until an outcome desired by the user is achieved.

In some embodiments, the artificial intelligence engine may automatically adjust the predefined parameters based on the user input. In some embodiments of the disclosure, the report and any regenerated reports may be transmitted to the user device in a distributed ledger environment. In further embodiments, the user may select data to be transferred from a primary distributed ledger to an intermediate distributed ledger to share the selected data with a third party. In some embodiments, the artificial intelligence engine may automatically select data for the intermediate distributed ledger based on who the data needs to be shared with. In some embodiments of the disclosure, the user input comprises hypothetical questions which the system or artificial intelligence engine can respond to by generating an interface component comprising the hypothetical outputs or answers, transmitting the interface component to the user device and triggering a configuration of the graphical user interface of the user device with the interface component, thus displaying the hypothetical output to the user through the user device.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for generating and dynamically adjusting artificial intelligence engine parameters in a distributed network, the system comprising:
    a processing device;
    a non-transitory storage device containing instructions when executed by the processing device, causes the processing device to perform the steps of:
        identify user data using associated with a user account;
        analyze, by an artificial intelligence engine, the user data based on one or more defined parameters used to train the artificial intelligence engine;
        generate an output by the artificial intelligence engine based on the analysis of the user data;
        generate, by the artificial intelligence engine, a report comprising information of at least one of the analysis of the user data for each of the one or more defined parameters or one or more reasons for the output;
    automatically transmit, to a user device, the report, wherein the report is transmitted to the user device in a distributed ledger environment;
        receive at least one user input in response to the report, wherein the at least one user input comprises a selection of data stored in a primary distributed ledger that, based on the selection, is to be sent to an intermediate distributed ledger so that the selection of data can be shared with a third party or an entity via the intermediate distributed ledger;
        generate, by the artificial intelligence engine, a regenerated output based on the at least one user input, wherein the at least one user input is applied to the one or more defined parameters; and
    automatically transmit, to the user device, a regenerated report based on the regenerated output.

2. The system of claim 1, wherein the user data is received from at least one of an initial user input or one or more external sources.

3. The system of claim 1, wherein the at least one user input is received from the one or more external sources.

4. The system of claim 1, wherein the one or more defined parameters are automatically modified by the artificial intelligence engine based on the at least one user input.

5. The system of claim 1, wherein the selection of data is automatically generated by the artificial intelligence engine for the intermediate distributed ledger based on the third party or the entity.

6. The system of claim 1, wherein the at least one user input comprises one or more of:
    a modification of the user data;
    additional user data;
    a request for further details on the report or reasons for the output; or
        one or more hypothetical questions about the output.

7. The system of claim 6, wherein the non-transitory storage device contains further instructions when executed by the processing device, causes the processing device to perform the steps of:
    generate an interface component comprising one or more hypothetical outputs based on the user input;
    transmit the interface component to the user device, wherein the user device comprises a graphical user interface; and
    trigger a configuration of the graphical user interface of the user device with the interface component.

8. A computer implemented method for generating and dynamically adjusting artificial intelligence engine parameters in a distributed network, the computer implemented method comprising:
    identifying user data using associated with a user account;
    analyzing, by an artificial intelligence engine, the user data based on one or more defined parameters used to train the artificial intelligence engine;
    generating an output by the artificial intelligence engine based on the analysis of the user data;
    generating, by the artificial intelligence engine, a report comprising information of at least one of the analysis of the user data for each of the one or more defined parameters or one or more reasons for the output;
    automatically transmitting, to a user device, the report, wherein the report is transmitted to the user device in a distributed ledger environment;
    receiving at least one user input in response to the report, wherein the at least one user input comprises a selection of data stored in a primary distributed ledger that, based on the selection, is to be sent to intermediate distributed ledger so that the selection of data ca be shared with a third party or an entity via the intermediate distributed ledger;
    generating, by the artificial intelligence engine, a regenerated output based on the at least one user input, wherein the at least one user input is applied to the one or more defined parameters; and
    automatically transmitting, to the user device, a regenerated report based on the regenerated output.

9. The computer implemented method of claim 8, wherein the selection of data is automatically generated by the artificial intelligence engine for the intermediate distributed ledger based on the third party or the entity.

10. The computer implemented method of claim 8, wherein the computer implemented method further comprises:
    generating an interface component comprising one or more hypothetical outputs based on the user input;
    transmitting the interface component to the user device, wherein the user device comprises a graphical user interface; and
    triggering a configuration of the graphical user interface of the user device with the interface component.

11. A computer program product for generating and dynamically adjusting artificial intelligence engine parameters in a distributed network, the computer program product comprising at least one non-transitory computer-readable medium having computer-readable code portions embodied therein, the computer readable code portions comprising:
    an executable code portion configured to identify user data using associated with a user account;

an executable code portion configured to analyze, by an artificial intelligence engine, the user data based on one or more defined parameters used to train the artificial intelligence engine;

an executable code portion configured to generate an output by the artificial intelligence engine based on the analysis of the user data;

an executable code portion configured to generate, by the artificial intelligence engine, a report comprising information of at least one of the analysis of the user data for each of the one or more defined parameters or one or more reasons for the output;

an executable code portion configured to automatically transmit, to a user device, the report, wherein the report is transmitted to the user device in a distributed ledger environment;

an executable code portion configured to receive at least one user input in response to the report, wherein the at least one user input comprises a selection of data stored in a primary distributed ledger that, based on the selection, is to be sent to an intermediate distributed ledger so that the selection of data can be shared with a third party or an entity via the intermediate distributed ledger;

an executable code portion configured to generate, by the artificial intelligence engine, a regenerated output based on the at least one user input, wherein the at least one user input is applied to the one or more defined parameters; and an executable code portion configured to automatically transmit, to the user device, a regenerated report based on the regenerated output.

12. The computer program product of claim 11, wherein the selection of data is automatically generated by the artificial intelligence engine for the intermediate distributed ledger based on the third party or the entity.

13. The computer program product of claim 11, wherein the computer readable code portions further comprise:

an executable code portion configured to generate an interface component comprising one or more hypothetical outputs based on the user input;

an executable code portion configured to transmit the interface component to the user device, wherein the user device comprises a graphical user interface; and an executable code portion configured to trigger a configuration of the graphical user interface of the user device with the interface component.

\* \* \* \* \*